United States Patent
Ronge et al.

Patent Number: 5,267,380
Date of Patent: Dec. 7, 1993

[54] METHOD AND APPARATUS FOR CENTERING A ROTARY BODY

[75] Inventors: Heinz Ronge, Darmstadt; Werner Lehr, Modautal, both of Fed. Rep. of Germany

[73] Assignee: Hofmann Maschinenbau GmbH, Pfungstadt, Fed. Rep. of Germany

[21] Appl. No.: 648,180

[22] Filed: Feb. 1, 1991

[30] Foreign Application Priority Data

Feb. 8, 1990 [DE] Fed. Rep. of Germany ....... 4003848

[51] Int. Cl.⁵ ............................................. B23Q 21/00
[52] U.S. Cl. .................... 29/33 R; 33/203.12; 73/146; 82/1.11; 82/170; 279/33; 279/126; 279/133
[58] Field of Search .............. 82/170, 903, 1.11, 162, 82/164; 29/33 R; 33/203, 203.11, 203.12, 520, 644, 672, 673, 674, 675; 73/146, 8; 279/4, 11, 133, 126, 4.02, 33; 157/1 R, 19, 21

[56] References Cited

U.S. PATENT DOCUMENTS

| | | | |
|---|---|---|---|
| 2,291,147 | 7/1942 | Carlsen | 279/4.02 |
| 2,352,885 | 7/1944 | Bukowsky | 82/170 |
| 2,849,675 | 8/1958 | Hall et al. | 73/146 |
| 3,464,264 | 9/1969 | French | 73/146 |
| 3,535,963 | 10/1970 | Dietl | 82/162 |
| 3,728,542 | 4/1973 | Golfier | 73/146 |
| 4,114,279 | 9/1978 | Johnson et al. | 33/203 |
| 4,295,396 | 10/1981 | Hasslauer | 82/163 X |
| 4,519,279 | 5/1985 | Ruggeri | 82/162 |
| 4,536,000 | 8/1985 | Rohm | 279/126 |
| 4,823,657 | 4/1989 | Welin-Berger | 82/162 |
| 4,828,276 | 5/1989 | Link et al. | 279/1 L |
| 4,905,551 | 3/1990 | Blaimschein | 82/1.11 |
| 4,909,521 | 3/1990 | Ovanin | 279/126 |
| 5,058,468 | 10/1991 | Lessway | 279/133 X |

FOREIGN PATENT DOCUMENTS

| | | | |
|---|---|---|---|
| 264754 | 6/1970 | U.S.S.R. | 73/146 |
| 795858 | 1/1981 | U.S.S.R. | 82/170 |

*Primary Examiner*—Z. R. Bilinsky
*Attorney, Agent, or Firm*—Cushman, Darby & Cushman

[57] ABSTRACT

In a method and apparatus for centering a rotary body such as a motor vehicle tire the rotary body is put into a centered position by means of a plurality of centering means which engage the circular periphery of the rotary body at distributed positions around the periphery thereof and which are acted upon by a centering force. The centering force acting on the centering means is set to be proportional to the diameter of the rotary body.

23 Claims, 2 Drawing Sheets

METHOD AND APPARATUS FOR CENTERING A ROTARY BODY

BACKGROUND OF THE INVENTION

For the purposes of testing and checking rotary bodies and more especially rotary bodies of an annular configuration, of a flexible material, such as for example a motor vehicle tire, it is necessary for the rotary body to be arranged in the testing machine in a centered position to carry out the quality control operation. For example, quality control operations are carried out on motor vehicle tires in equipment referred to as tire uniformity measuring machines. In such a machine, a pneumatic tire to be measured and checked is mounted in position on measuring rim portions, and rolled against a test surface. During that operation, measurements are made of irregularities or non-uniformities of the forces involved, in order to arrive at an indication of the quality of the tire. For that purpose, it is necessary for the clamping devices, for holding the tire in position in the machine, to have a centering relationship. A similar consideration applies if the machine is so designed as to mount a wheel with a tire thereon, for carrying out a quality control operation on the tire. In practice it has been found that, particularly when the centering arrangement also provides for measuring the diameter of the rotary body to be subjected to the testing operation, incorrect measurements may occur when dealing with different successive types of tires, so that in that case the clamping devices in the machine for holding the tire or the vehicle wheel in the appropriate position therein are not disposed in a properly centralizing relationship.

SUMMARY OF THE INVENTION

An object of the present invention is to provide a method of centering a rotary body which is simple to carry into effect while providing for satisfactory centering, even of different successive types of rotary bodies.

Another object of the present invention is to provide a method of centering a rotary body which affords enhanced accuracy while also giving improved adaptability to different types of rotary bodies.

Still another object of the present invention is to provide an apparatus for centering a rotary body, which is reliable in operation, simple in structure and provides improved results.

In accordance with the foregoing and other objects in accordance with the present invention a method is set forth for centering a rotary body of flexible or yielding material having a circular periphery, such as a motor vehicle tire. This method provides that the rotary body is put into a centered position by means of a plurality of centering means which are caused to engage the circular periphery of the rotary body in a distributed manner and which are acted upon by a centering force. The magnitude of the centering force acting on the centering means is set proportionally to the diameter of the rotary body to be centered.

In accordance with a second aspect of the invention, the foregoing and other objects are achieved by an apparatus for centering a rotary body of yielding or flexible material comprising a circular periphery, such as a motor vehicle tire, comprising a plurality of centering means which are adapted to engage the circular periphery of the rotary body in a distributed array, and which are acted upon by a centering force. The magnitude of the centering force acting on the centering means is regulated proportionally to the diameter of the rotary body.

The invention is based on the realization that the stiffness of the rotary body, which may be of an annular configuration, of yielding or flexible material, is dependent on its diameter. That is the reason why, in conventional centering methods and apparatuses for use with motor vehicle tires, a tire of small diameter was deformed to a disproportionately high degree by the centering means which were subjected to the same force to cause them to produce their centering action, as when they were operative to center a tire of a larger diameter. That situation gave rise to incorrect measurements which resulted in non-central actuation of the clamping devices for holding the tire or the motor vehicle wheel carrying same in position in a measuring machine, particularly when the centering operation simultaneously involved the step of measuring the diameter of the motor vehicle tire being processed at that time.

The fact that, in accordance with the invention, the centering force or the pushing force acting on the centering means of the apparatus to produce the centering effect is regulated in dependence on the diameter of the respective rotary body to be centered provides that, when dealing with a tire of large diameter, a higher centering force or force applied to the centering means is operable than when dealing with a tire of smaller diameter.

In that respect, it is advantageous for the operating movement of the centering means acted upon by the centering force to be sensed and for the centering force to be reduced in response to an operating movement which occurs in the sense of a reduction in diameter of the rotary body. The variation in centering force occurs proportionally to the diameter of the rotary body to be centered, preferably using linear proportionality in the variation in the centering force. It is also possible however to adjust the centering force in dependence on the respective types of rotary bodies such as tires involved, and to store corresponding data in a memory, which data can then be called up in relation to the respective type of rotary body to be processed, for suitably setting the centering force for that rotary body.

Preferably the operating movement of the centering means is in the form of a pivotal movement on a circular path, with the centering means being moved in synchronous relationship in the centering operation. In that case the angle of pivotal movement of the centering means is preferably sensed and the centering force is reduced in the case of an operating movement which occurs in a direction towards the center of the rotary body.

Preferably, a pressure fluid, more especially a hydraulic pressure fluid, may be used to produce the centering force. The operating movement is then produced by means of a hydraulic piston-cylinder unit. The feed of pressure fluid to the piston-cylinder unit takes place in dependence on the respective sensed position assumed by the centering means during their operating movement in the centering operation. The sensed positioning of the centering means is preferably passed to a proportional regulator device which then suitably regulates the feed of pressure fluid to the piston-cylinder device.

Further objects, features and details of the invention will be apparent from the following description of a preferred embodiment.

DESCRIPTION OF THE PREFERRED EMBODIMENT

Figure 1:
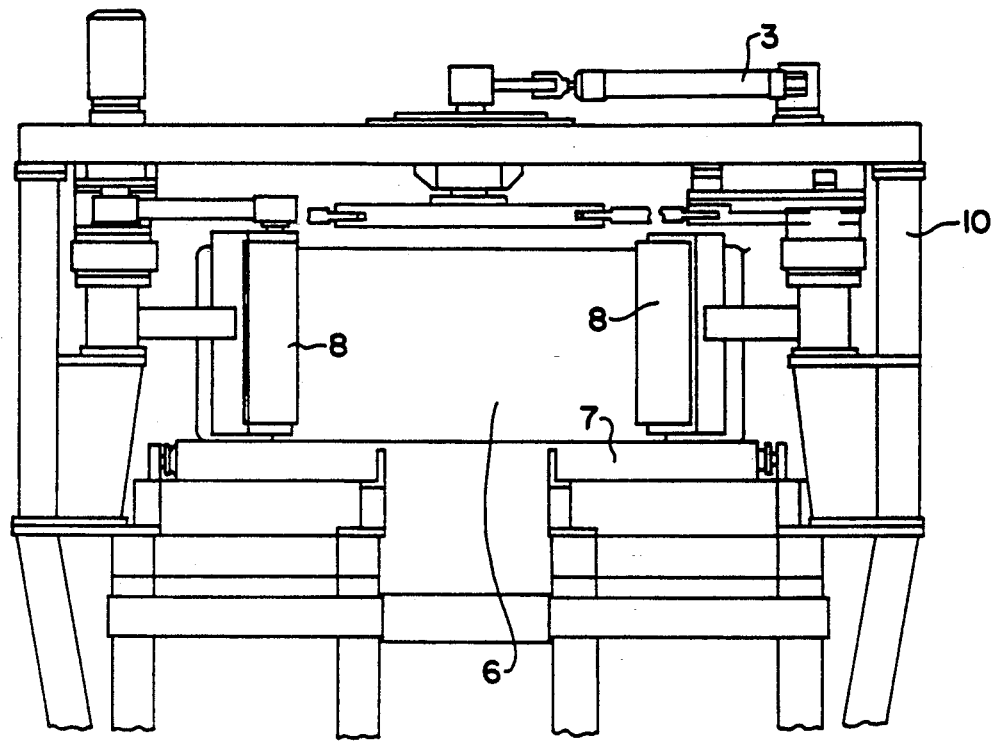
FIG. 1 is a front view of a centering apparatus as an embodiment of the present invention.
Figure 2:
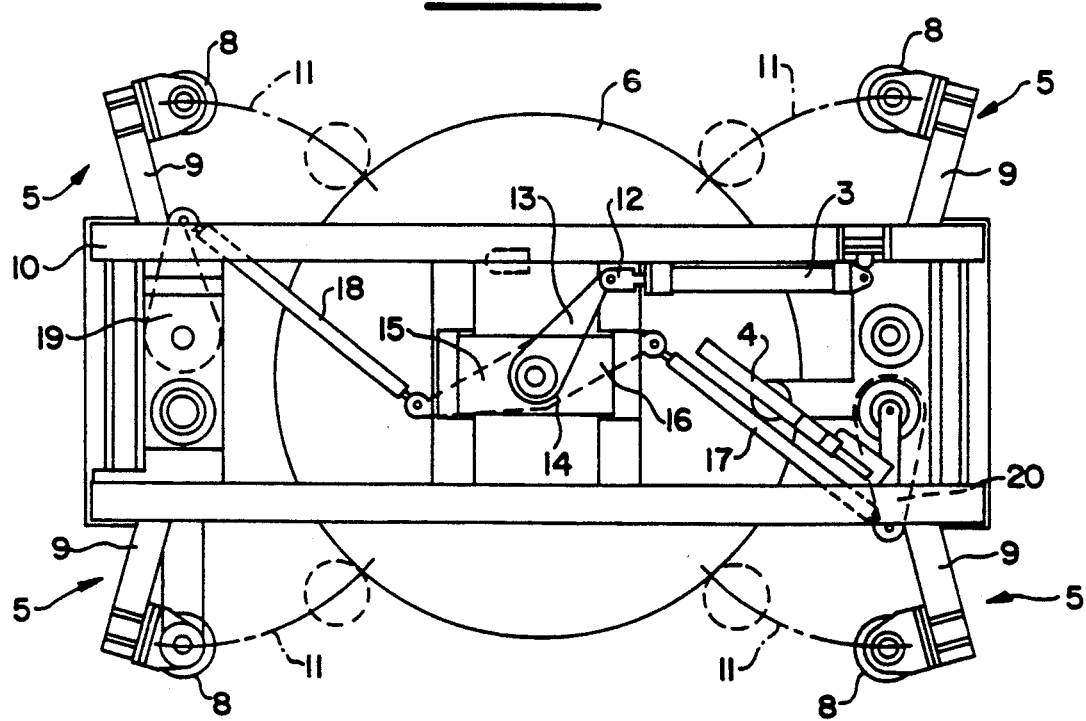
FIG. 2 is a plan view of the apparatus shown in FIG. 1, FIG. 3 diagrammatically shows a regulating circuit used in the arrangement illustrated in FIGS. 1 and 2, for controlling the force applied to the centering means.

Referring to FIGS. 1 and 2, in the apparatus for centering a rotary body 6 comprising at least an outer annular portion of yielding or flexible material, comprising a circular periphery, such as a motor vehicle tire or a motor vehicle wheel carrying a motor vehicle tire thereon, four centering means each generally indicated by reference numeral 5 are arranged on a machine frame structure 10 pivotably about respective vertical axes. Each of the centering means 5 has a centering roller 8 disposed at the free end of a centering lever 9. The centering rollers 8 can perform a pivotal movement on respective circular paths about the vertical pivot axes at which the respective centering levers 9 are pivotally mounted to the machine frame structure 10.

A rotary body 6 to be centered, which, as indicated above, may be in particular in the form of a motor vehicle tire, is introduced into the centering apparatus by means of transportation rollers indicated diagrammatically at 7 in FIG. 1.

To produce the operating movements which are performed by the centering means 5 in the centering operation, the apparatus has a piston-cylinder device as indicated at 3, constituting an operating movement means or a control member drive arrangement. Preferably the piston-cylinder device 3 is a hydraulic device. The piston-cylinder device 3 is pivotally connected to the machine frame structure 10 by one end, preferably by means of its cylinder portion. At its other end the piston-cylinder device 3 preferably engages by means of the end 12 of its piston rod a crank arm 13 of a crank arrangement 14. In the embodiment shown in FIGS. 1 and 2, the crank arrangement 14 has two actuating arms 15 and 16 which are shown in broken lines in FIG. 2. The free ends of the actuating arms 15 and 16 are connected to the first ends of respective actuating rods 17 and 18, the other ends of which are connected to the centering levers 9. In the specific embodiment illustrated, the connection between the actuating rods 17 and 18 and the centering levers 9 is by way of respective pivot arms which are shown in broken lines in FIG. 2 and indicated by reference numerals 19 and 20.

The illustrated crank drive arrangement which is operated by the piston-cylinder device 3 provides a synchronous operating movement for the centering means 5. For that purpose, all four centering means 5 may be connected by way of corresponding actuating rods (of which only two are shown in FIG. 2) to four corresponding actuating arms (only actuating arms 15 and 16 are shown in FIG. 2) at the crank arrangement 14. It is also possible however, as shown in FIG. 2, for two actuating arms 15 and 16 to be provided at the crank arrangement 14, with those actuating arms 15 and 16 being connected to two centering means 5. To provide for the synchronous operating movement of the other two centering means 5 which are not directly connected to the two actuating arms 15 and 16, the arrangement may include a gear transmission assembly which at each side of the apparatus in FIG. 2 transmits the rotary movement of the two centering means 5 driven from the crank arrangement 14, to the other two centering means 5.

Figure 3:
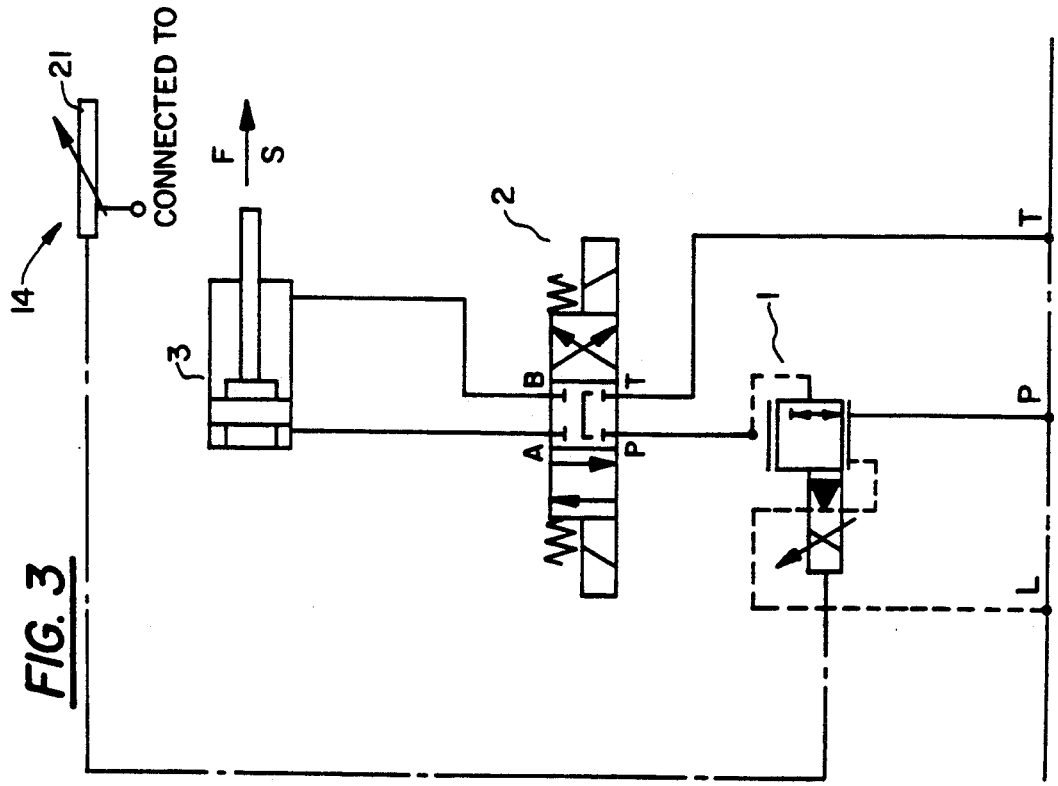

During the centering operation, the centering rollers 5 are moved on circular paths diagrammatically indicated at 11 in FIG. 2, towards the rotary body 6 to be centered. That pivotal movement is sensed by a sensing device 4. The sensing device 4 may include a linear potentiometer as diagrammatically indicated at 21 in FIG. 3 to which reference is therefore directed. The potentiometer position thereof is thus proportional to the respective angle of pivotal movement of the synchronously moved centering levers 9. The output of the linear potentiometer 21 is connected to a regulating device indicated at 1 in FIG. 3, in the form of a proportional regulator, so that in operation of the rotary body centering apparatus, the potentiometer 21 supplies a corresponding output signal to the regulating device 1. The respective position of the centering levers 9 and therewith also the centering rollers 8 is steplessly detected by the linear potentiometer 21 in that way. In dependence on the output signal supplied, the regulating device 1 can now steplessly regulate an adjusting device, indicated at 2 in FIG. 3, which as illustrated can be in the form of a valve and more particularly a hydraulic four/three way valve. In dependence on the respective valve position, the hydraulic piston-cylinder device 3 is supplied with hydraulic fluid so that a corresponding thrust force is synchronously transmitted to the centering means 5 by way of the crank drive assembly 13-16 and the actuating rods 17 and 18.

Figure 4:
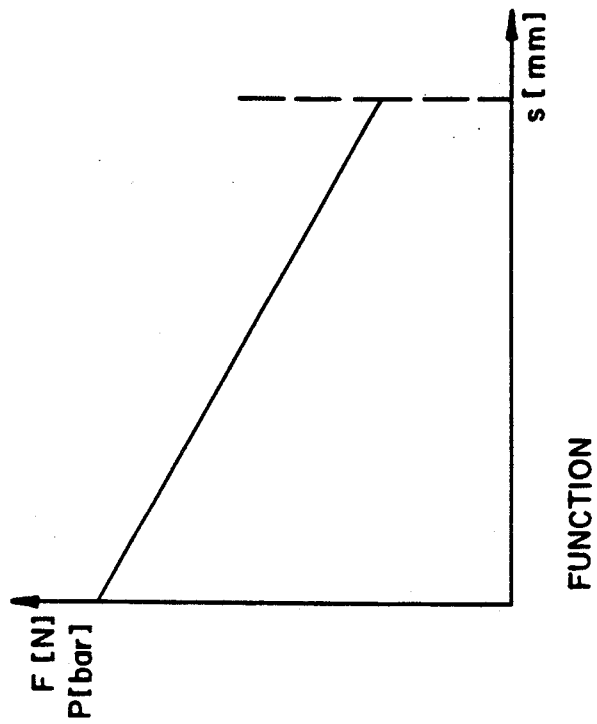
FIG. 4 shows a pressure curve constituting the characteristic involved in proportional regulation.

FIG. 4 shows the pressure curve involved in operation of the apparatus. The pressure curve can be freely preselected but it is preferably a linear curve forming the characteristic for the proportional regulator 1.

Having described the structure of the apparatus according to the invention, the mode of operation thereof will now be set forth.

With a decreasing effective diameter in respect of the centering means 5, that is to say, upon movement of the centering rollers 8 towards the centering position thereof as indicated by the broken-line illustrations of the rollers 8 in FIG. 2, there is a reduction in the pressure with which the piston of the piston-cylinder device 3 is displaced in the centering direction, that is to say, so that the rollers 8 are moved inwardly along their respective circular paths. That therefore also reduces the thrust forces which act on the centering means 5 as they approach the rotary body 6 to be centered.

As soon as the centering rollers 8 come to bear against the circular outside periphery of the rotary body 6 to be centered, they apply the same centering forces thereto, such forces being of such a magnitude as to avoid deformation of the rotary body to be centered.

That therefore provides for satisfactory centering of the rotary body, while the centering forces acting thereon in the centering operation are regulated proportionally to the diameter of the rotary body 6 and thus proportionally to its stiffness. If the rotary body 6 is a motor vehicle tire, a centering force is provided which is dependent on the degree of stiffness of the tire.

It is also possible for data which are dependent on the respective type of tire being tested to be put into storage or memory, and for actuation of the piston-cylinder device 3 to be controlled in dependence on such data, when dealing with the appropriate respective tire.

The illustrated centering apparatus may also be used at the same time as a measuring assembly for measuring the diameter of the centered rotary body 6. As the centering rollers 8 do not impress themselves into the rotary body 6, as a result of not causing serious deformation thereof, as indicated above, they can provide for satisfactory diameter measurement for the rotary body 6. The diameter measurement can be ascertained for example from the curve shown in FIG. 4 because it is possible to deduce therefrom accurate information concerning the positioning of the centering rollers 8. However it is also possible for that purpose to evaluate the signal outputted by the sensing device 4 or the linear potentiometer 21, as a measurement in respect of the diameter of the rotary body.

When the rotary body 6 is introduced into the centering apparatus, on the transportation rollers 7, it will generally firstly be in an out-of-center position, from which it is moved into a central position by the centering means 5 during the centering operation. Particularly when centering rotary bodies in the form of motor vehicle tires, that procedure gives the advantage that, when dealing with tires of relatively small diameter which are generally also of relatively smaller weight, the centering force that has to be applied to move the tire into a centered position is lower than when dealing with a tire of larger diameter and also larger weight. That means that the apparatus applies to the tire a centering force which is adapted to the respective weight thereof.

It will be appreciated that the above-described method and apparatus for centering a rotary body have been set forth solely by way of example and illustration of the principles of the present invention and that various modifications and alterations may be made therein without thereby departing from the spirit and scope of the present invention.

We claim:

1. An apparatus for centering a rotary body having a circular periphery comprising:
    a plurality of centering members adapted to engage the periphery of the rotary body,
    drive means operatively connected to said centering members for moving the centering members toward and away from said rotary body, said drive means including (1) a piston cylinder supplied with a pressurized fluid to produce a centering force, and (2) a crank transmission for synchronously transmitting the movement of the piston cylinder to the centering members, and
    control means for sensing movement of the centering members and, in response to the sensed movement, regulating the magnitude of the centering force acting on the centering members so that the force is proportional to the diameter of the rotary body.

2. Apparatus as set forth in claim 1 wherein the centering members include levers pivotally mounted to the apparatus, the levers including centering rollers disposed at free ends thereof, the levers being adapted to be synchronously pivoted by the drive means.

3. Apparatus as in claim 1 wherein the centering members are moved synchronously into engagement with said rotary body.

4. Apparatus as in claim 1 wherein said control means includes an adjusting device mounted within a hydraulic fluid line leading to the piston cylinder and a regulator operatively connected to the adjusting device and the centering members so that the flow of hydraulic fluid to the piston cylinder is regulated in response to movement of the centering members.

5. Apparatus as in claim 1 wherein the centering members are positioned in a spaced apart manner so as to engage the rotary body in a substantially evenly distributed manner about the periphery thereof.

6. Apparatus as in claim 1 wherein said control means includes an adjusting device and a regulator operatively connected to the adjusting device and the centering members for adjusting the centering force provided by said drive means in response to movement of the centering members.

7. A method of centering a motor vehicle tire in centering apparatus comprising the steps of:
    introducing the tire into the centering apparatus;
    producing a centering force by a piston cylinder supplied with a pressurized fluid;
    transmitting movement of the piston cylinder to a plurality of centering members for moving the centering members toward and away from the tire;
    initiating a centering operation on the tire by synchronously moving each centering member of the plurality of centering members into engagement with the periphery of the tire;
    sensing the positions of the centering members; and
    regulating the pressurized fluid based on the sensed positions of the centering members so as to apply a centering force to the tire, the centering force having a magnitude proportional to the diameter of the tire.

8. A method as set forth in claim 7 wherein the centering members are moved on circular paths in the centering operation.

9. A method as set forth in claim 7, including the further step of measuring the diameter of the rotary body when in a centered position.

10. A method as set forth in claim 7, wherein the step of engaging the periphery of the tire includes engaging the tire at a plurality of distributed locations about the periphery.

11. An apparatus for centering a rotary body having a circular periphery comprising:
    a plurality of centering members adapted to engage the periphery of the rotary body,
    drive means operatively connected to said centering members for moving the centering members toward and away from said rotary body, and
    control means for sensing movement of the centering members and in response to the sensed movement regulating the magnitude of the centering force acting on the centering members so that the force is proportional to the diameter of the rotary body.

12. Apparatus as set forth in claim 11 wherein the centering members include centering rollers and levers pivotally mounted to the apparatus carrying the centering rollers, the levers being adapted to be synchronously pivoted by the drive means.

13. Apparatus as set forth in claim 11 wherein the drive means includes a piston cylinder supplied with a pressurized fluid to produce the centering force.

14. Apparatus as set forth in claim 13 wherein the drive means includes a crank transmission for synchronously transmitting the movement of the piston cylinder to the centering members.

15. Apparatus as in claim 11 wherein the centering members are moved synchronously into engagement with said rotary member.

16. Apparatus as in claim 11 wherein said drive means includes a hydraulically actuated drive member and said control means includes an adjusting device for adjusting the flow of hydraulic fluid to the drive member and a regulating element for actuating said adjusting device in response to the sensed movement of the centering members.

17. Apparatus as in claim 11 wherein the centering members are positioned in a spaced apart manner so as to engage the rotary body in a substantially evenly distributed manner about the periphery thereof.

18. Apparatus as in claim 11 wherein said drive means includes an actuatable drive member and said control means includes an adjusting device for adjusting the force with which the drive member is actuated and a regulating element for actuating said adjusting device in response to the sensed movement of the centering members.

19. A method of centering a rotary body of flexible material having a circular periphery comprising the steps of:
synchronously moving a plurality of centering members in a centering operation into engagement with the periphery of the rotary body so as to apply centering forces at a plurality of spaced apart locations about said periphery,
sensing the locations of the centering members, and
adjusting the magnitude of the centering forces to be proportional to the diameter of the rotary body.

20. An apparatus for centering a rotary body having a circular periphery comprising:
a plurality of centering members adapted to engage the periphery of the rotary body,
drive means operatively connected to said centering members for moving the centering members on a circular path toward and away from said rotary body, said drive means including (1) a piston cylinder supplied with a pressurized fluid to produce a centering force, and (2) a crank transmission for synchronously transmitting the movement of the piston cylinder to the centering members, and
control means for sensing movement of the centering members and, in response to the sensed movement, regulating the magnitude of the centering force acting on the centering members so that the force is proportional to the diameter of the rotary body.

21. An apparatus for centering a rotary body having a circular periphery comprising:
a plurality of centering members adapted to engage the periphery of the rotary body,
drive means operatively connected to said centering members for moving the centering members toward and away from said rotary body, said drive means including (1) a piston cylinder supplied with a pressurized fluid to produce a centering force, and (2) a crank transmission for synchronously transmitting the movement of the piston cylinder to the centering members, and
control means for sensing movement of the centering members and, in response to the sensed movement, regulating the magnitude of the centering force acting on the centering members so that the force is proportional to the diameter of the rotary body,
said centering members including levers pivotally mounted to the apparatus, the levers including centering rollers disposed at free ends thereof, the levers being adapted to be synchronously pivoted by the drive means.

22. A method of centering a motor vehicle tire in centering apparatus comprising the steps of:
introducing the tire into the centering apparatus;
producing a centering force by a piston cylinder supplied with a pressurized fluid;
transmitting movement of the piston cylinder to a plurality of centering members for moving the centering members toward and away from the tire;
initiating a centering operation on the tire by synchronously moving each centering member of the plurality of centering members into engagement with the periphery of the tire;
sensing the positions of the centering members;
measuring the diameter of the tire when in a centered position; and
regulating the pressurized fluid based on the sensed positions of the centering members so as to apply a centering force to the tire, the centering force having a magnitude proportional to the diameter of the tire.

23. A method of centering a motor vehicle tire in centering apparatus comprising the steps of:
introducing the tire into the centering apparatus;
producing a centering force by a piston cylinder supplied with a pressurized fluid;
transmitting movement of the piston cylinder to a plurality of centering members for moving the centering members toward and away from the tire;
initiating a centering operation on the tire by synchronously moving each centering member of the plurality of centering members on a circular path into engagement with the periphery of the tire;
sensing the positions of the centering members; and
regulating the pressurized fluid based on the sensed positions of the centering members so as to apply a centering force to the tire, the centering force having a magnitude proportional to the diameter of the tire.

* * * * *